(12) United States Patent
Takahashi

(10) Patent No.: US 10,618,356 B2
(45) Date of Patent: Apr. 14, 2020

(54) PNEUMATIC TIRE

(71) Applicant: TOYO TIRE & RUBBER CO., LTD., Itami-shi, Hyogo (JP)

(72) Inventor: Souichi Takahashi, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 268 days.

(21) Appl. No.: 15/715,345

(22) Filed: Sep. 26, 2017

(65) Prior Publication Data

US 2018/0162173 A1    Jun. 14, 2018

(30) Foreign Application Priority Data

Dec. 9, 2016   (JP) .................. 2016-239065

(51) Int. Cl.
*B60C 11/12*   (2006.01)
*B60C 11/04*   (2006.01)
*B60C 11/03*   (2006.01)

(52) U.S. Cl.
CPC .......... *B60C 11/1236* (2013.01); *B60C 11/04* (2013.01); *B60C 11/1204* (2013.01); *B60C 2011/0372* (2013.01); *B60C 2011/0381* (2013.01); *B60C 2011/1209* (2013.01); *B60C 2011/1213* (2013.01)

(58) Field of Classification Search
CPC ...... B60C 11/12–1236; B60C 2011/0358–036
See application file for complete search history.

(56) References Cited

U.S. PATENT DOCUMENTS 3,115,919 A * 12/1963 Roberts ................. B60C 11/032
                                                    152/209.17
4,736,783 A *  4/1988 Motomura ............ B60C 9/2006
                                                    152/209.22
4,878,526 A * 11/1989 Ochiai .................... B60C 11/01
                                                    152/209.22
5,658,404 A *  8/1997 Brown ................ B60C 11/0309
                                                    152/209.8

(Continued)

FOREIGN PATENT DOCUMENTS

JP       47-1105 A    1/1972
JP      49-96403 A    9/1974

(Continued)

OTHER PUBLICATIONS

Office Action dated Oct. 24, 2017, issued in counterpart Japanese Application No. 2016-239065, with English translation (4 pages).

(Continued)

*Primary Examiner* — Jodi C Franklin
(74) *Attorney, Agent, or Firm* — Westerman, Hattori, Daniels & Adrian, LLP

(57) ABSTRACT

In a pneumatic tire, a land portion is provided with a land groove connected to a peripheral grooves only in first end portion among both end portions. A direction in which the first end portion of the land groove connected to first side of at least one the peripheral groove is inclined to a tire width direction is the same as a direction in which the first portion of the land groove connected to second side of the peripheral groove is inclined to the tire width direction.

8 Claims, 4 Drawing Sheets

(56) References Cited

U.S. PATENT DOCUMENTS

| | | | | |
|---|---|---|---|---|
| 5,795,415 | A | * | 8/1998 | Campana ............ B60C 11/0309 152/209.18 |
| 5,837,074 | A | * | 11/1998 | Uemura ............. B60C 11/0302 152/209.18 |
| 6,142,200 | A | * | 11/2000 | Feider ............... B60C 11/0309 152/209.14 |
| 8,517,070 | B2 | * | 8/2013 | Bolzoni ............. B60C 11/0306 152/209.18 |
| D741,791 | S | * | 10/2015 | Severyn ....................... D12/584 |
| 2010/0132864 | A1 | * | 6/2010 | Colombo ............ B60C 11/0302 152/209.8 |
| 2012/0273103 | A1 | * | 11/2012 | Ishida ............... B60C 11/0306 152/209.8 |
| 2013/0000805 | A1 | * | 1/2013 | Oodaira ................. B60C 11/11 152/209.18 |
| 2013/0092304 | A1 | * | 4/2013 | Murata ............. B60C 11/0306 152/209.18 |
| 2014/0283967 | A1 | * | 9/2014 | Inoue ..................... B60C 11/12 152/209.18 |
| 2016/0144668 | A1 | * | 5/2016 | Oba ................... B60C 11/0306 152/209.25 |
| 2016/0325590 | A1 | * | 11/2016 | Moser ................ B60C 11/0306 |
| 2017/0267029 | A1 | * | 9/2017 | Nagase .............. B60C 11/0302 |
| 2017/0305199 | A1 | * | 10/2017 | Hatanaka ............ B60C 11/0008 |
| 2018/0154697 | A1 | * | 6/2018 | Yamaoka ............ B60C 11/0306 |
| 2018/0215206 | A1 | * | 8/2018 | Kuriyama ............... B60C 11/01 |

FOREIGN PATENT DOCUMENTS

| | | | | |
|---|---|---|---|---|
| JP | 05345505 | A | * 12/1993 | ......... B60C 11/1263 |
| JP | 2011-25786 | A | 2/2011 | |
| JP | 2011-73471 | A | 4/2011 | |
| JP | 2014-184828 | A | 10/2014 | |
| JP | 5665844 | B2 | 2/2015 | |
| JP | 2015-157600 | A | 9/2015 | |
| JP | 5899287 | B2 | 4/2016 | |
| JP | 2016-74357 | A | 5/2016 | |
| WO | 2012/005187 | A1 | 1/2012 | |
| WO | 2016/056168 | A1 | 4/2016 | |

OTHER PUBLICATIONS

Office Action dated Feb. 22, 2019, issued in counterpart DE application No. 102017125929.5, with English translation. (11 pages).

Office Action dated Jul. 22, 2019, issued in CN application No. 201710700307.6, with English translation. (15 pages).

* cited by examiner

PNEUMATIC TIRE

CROSS REFERENCE TO RELATED APPLICATIONS

This application claims the benefit of priority of Japanese application no. 2016-239065, filed on Dec. 9, 2016, which is incorporated herein by reference.

BACKGROUND OF THE INVENTION

Field of the Invention

The present invention relates to a pneumatic tire having a plurality of land portions which are sectioned by a plurality of peripheral grooves.

Description of the Related Art

Conventionally, as a pneumatic tire, there has been known a pneumatic tire having a plurality of land portions which are sectioned by a plurality of peripheral grooves extending along a tire peripheral direction. Further, since the land portion is provided with a lot of land grooves, an ice steering stability of the tire is excellent (for example, Japanese Patent Nos. 5665844 and 5899287).

In the meantime, in the pneumatic tire according to Japanese Patent Nos. 5665844 and 5899287, since the land groove extends along a whole region in a tire width direction of the land portion, a rigidity of an end portion area of the land portion in the tire width direction becomes small. Therefore, since deformation of the end portion area of the land portion in the tire width direction is enlarged in relation to a force in a specific direction, a width of a peripheral groove may be too large. As a result, a dry braking performance of the tire is deteriorated, and it is hard to use the pneumatic tire mentioned above in all seasons.

SUMMARY OF THE INVENTION

Accordingly, an object is to provide a pneumatic tire which can improve the dry braking performance while maintaining a snow steering stability.

Means for Solving the Problem

There is provided a pneumatic tire, which includes:
a tread portion having a plurality of peripheral grooves which extend along a tire peripheral direction, and a plurality of land portions which are sectioned by the plurality of peripheral grooves,
wherein the land portion is provided with a land groove connected to the peripheral grooves only in first end portion among both end portions, and
wherein a direction in which the first end portion of the land groove connected to first side of at least one the peripheral groove is inclined to a tire width direction is the same as a direction in which the first portion of the land groove connected to second side of the peripheral groove is inclined to the tire width direction.

Also, the pneumatic tire may have a configuration in which:
the land groove is formed so as to have one bent portion in the first end portion side of the land groove.

Also, the pneumatic tire may have a configuration in which:
the bent portion of the land groove connected to the first side of the peripheral groove is formed so as to be convex toward one side in a tire peripheral direction, and
wherein the bent portion of the land groove connected to the second side of the peripheral groove is formed so as to be convex toward the other side in the tire peripheral direction.

Also, the pneumatic tire may have a configuration in which:
the bent portion of the land groove arranged in the land portion arranged between the peripheral grooves is arranged in an end area of the land portion in the tire width direction.

Also, the pneumatic tire may have a configuration in which:
the land portion arranged between the peripheral grooves is provided with a plurality of the land grooves having the bent portions,
wherein at least one of the bent portions is arranged in an end area in one side of the land portion in the tire width direction, and
wherein at least one of the bent portions is arranged in an end area in the other side of the land portion in the tire width direction.

Also, the pneumatic tire may have a configuration in which:
the directions in which the respective first end portions of the plurality of land grooves connected to the peripheral groove are inclined to the tire width direction are all the same direction.

As mentioned above, the pneumatic tire achieves an excellent effect that the dry braking performance can be improved while maintaining the snow steering stability.

DETAILED DESCRIPTION OF THE INVENTION

Figure 1:
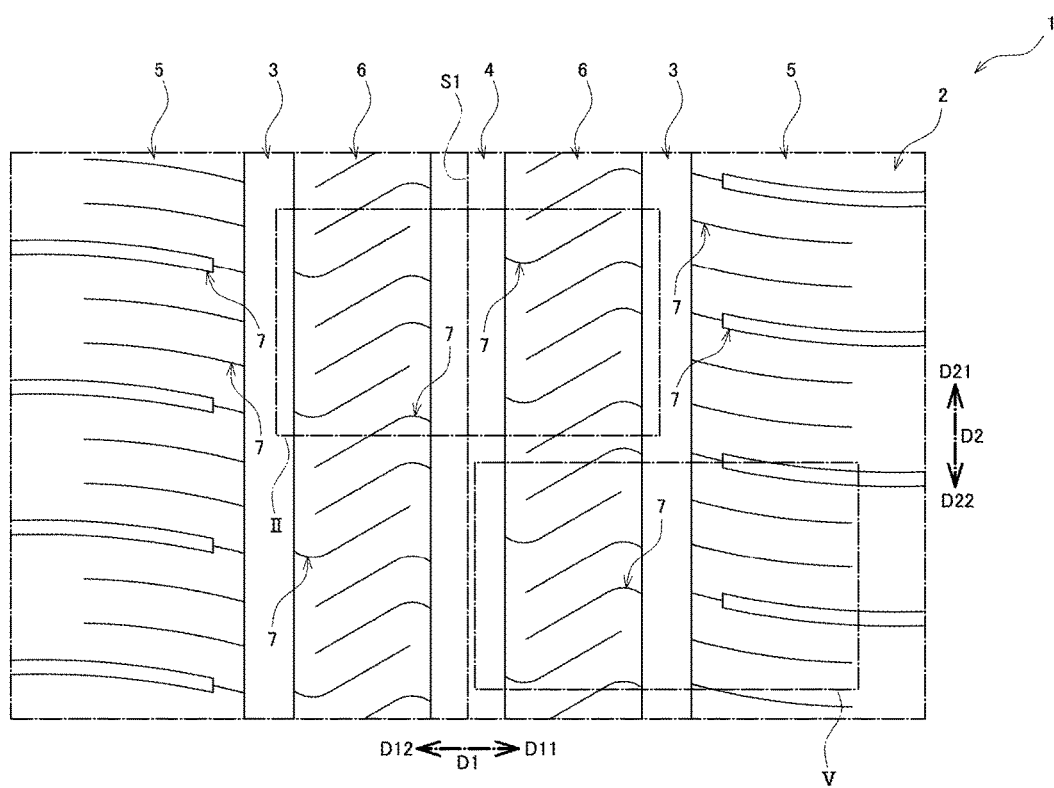
FIG. 1 is a development view of a substantial part of a tread surface of a pneumatic tire according to an embodiment.

A description will be given below of an embodiment in a pneumatic tire with reference to FIGS. 1 to 5. In each of the drawings, a dimensional ratio of the drawing does not necessarily coincide with an actual dimensional ratio, and the dimensional ratio between the drawings does not necessarily coincide with each other.

In FIG. 1 (same applies to the subsequent drawings), a first direction D1 is a tire width direction D1 which is parallel to a tire rotation axis, and a second direction D2 is a tire peripheral direction D2 which is a direction around the tire rotation axis. One side in the tire width direction D1 (a right direction in FIG. 1) is called as a first width direction D11, and the other direction (a left direction in FIG. 1) is called as a second width direction D12. Further, one direction in the tire peripheral direction D2 (an upward direction in FIG. 1) is called as a first peripheral direction D21, and the other direction (a downward direction in FIG. 1) is called as a second peripheral direction D22.

Further, a tire radial direction is a diametrical direction of the pneumatic tire (hereinafter, refer simply to as "tire") 1. Further, a tire equator surface S1 is a surface which is orthogonal to the tire rotation axis and is a surface which is positioned at the center in the tire width direction D1, and a tire meridian surface is a surface which includes the tire rotation axis and is a surface which is orthogonal to the tire equator surface S1.

As shown in FIG. 1, the tire 1 according to the present embodiment is provided with a pair of bead portions (not shown), side wall portions (not shown) which extend outward in the tire radial direction from the respective bead portions, and a tread portion 2 which is connected to outer end portions of a pair of side wall portions in the tire radial direction and forms a tread surface in its outer surface. The tire 1 is installed to a rim (not shown) and an inner portion of the tire 1 is pressurized by air.

The tread portion 2 is provided with a plurality of peripheral grooves 3 and 4 which extend along the tire peripheral direction D2, and a plurality of land portions 5 and 6 which are sectioned by a plurality of peripheral grooves 3 and 4. In the present embodiment, three peripheral grooves 3 and 4 are provided and four land portions 5 and 6 are provided. The numbers of the peripheral grooves 3 and 4 and the land portions 5 and 6 are not limited to the above structure. The peripheral grooves 3 and 4 are the grooves which extend along the tire peripheral direction D2, and the grooves which are arranged in the ground surface grounding on the road surface.

The peripheral groove 3 arranged in the outermost side in the tire width direction D1 is called as the shoulder peripheral groove 3, and the peripheral groove 4 arranged in an inner side in the tire width direction D1 than the shoulder peripheral groove 3 is called as the center peripheral groove 4. Further, the land portion 5 arranged in an outer side in the tire width direction D1 than the shoulder peripheral groove 3 is called as the shoulder land portion 5, and the land portion 6 arranged between the shoulder peripheral groove 3 and the center peripheral groove 4 is called as the center land portion 6. In the present embodiment, the center peripheral groove 4 is arranged on the tire equator surface S1.

The land portions 5 and 6 are provided with a plurality of land grooves 7 which extend so as to intersect the tire peripheral direction D2. The land groove 7 is provided with a narrow groove which is narrower than the peripheral grooves 3 and 4, and a sipe which is narrower than the narrow groove. For example, the narrow groove corresponds to a concave portion in which a width is equal to or more than 1.0 mm, and the sipe corresponds to a concave portion in which a width is less than 1.0 mm. Since a lot of land grooves 7 are provided as mentioned above, the tire 1 is excellent in a snow steering stability.

Here, a description will be given of a structure of the land groove 7 in relation to the peripheral grooves 3 and 4 and the land portions 5 and 6. First of all, a description will be given of the center peripheral groove 4 and the center land portions 6 and 6 with reference to FIGS. 2 to 4.

Figure 2:
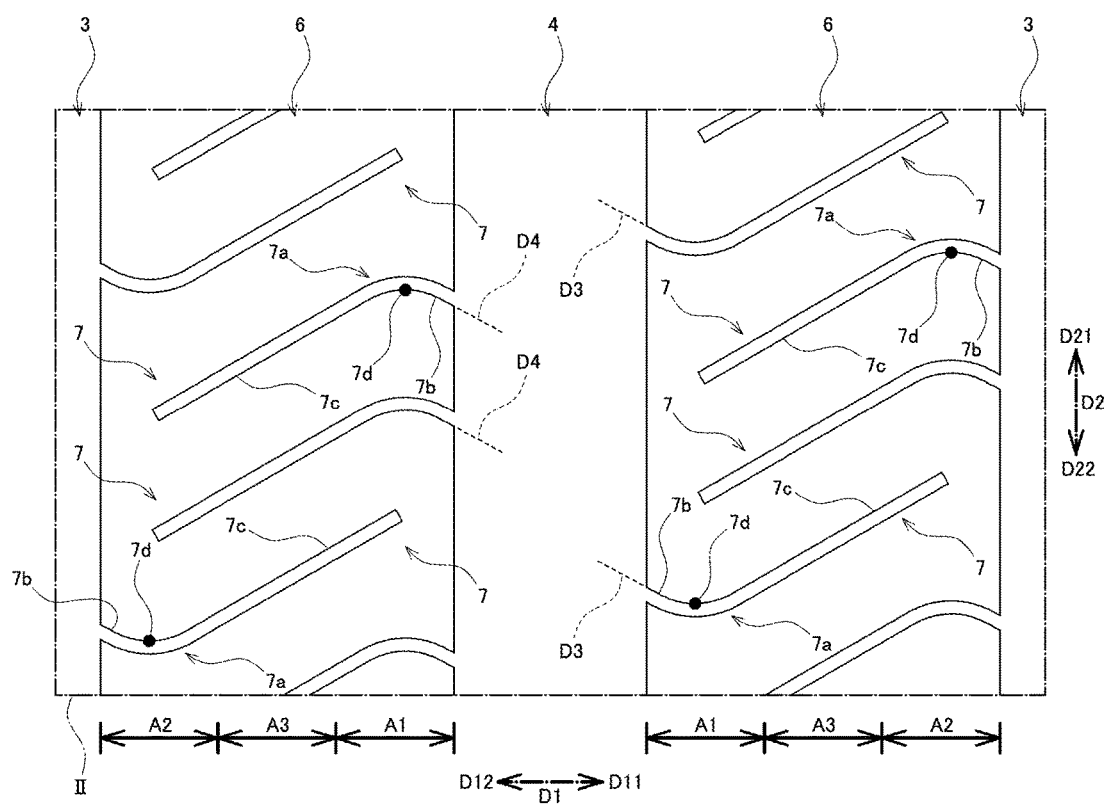
FIG. 2 is an enlarged view of an area II in FIG. 1.

As shown in FIG. 2, the center land portion 6 is sectioned into end areas A1 and A2 which are arranged in an outer side in the tire width direction D1, and a center area A3 which is arranged between the end areas A1 and A2. The end areas A1 and A2 and the center area A3 are sectioned evenly (every one thirds) in the tire width direction D1. The end area A1 in an inner side in the tire width direction D1 is called as the inside end area A1, and the end area A2 in an outer side in the tire width direction D1 is called as the outside end area A2.

In the land groove 7 provided in the center land portion 6 arranged between the peripheral grooves 3 and 4, one end portion (first end portion) is connected to the peripheral grooves 3 and 4, and the other end portion (second end portion) is away from the peripheral grooves 4 and 3. More specifically, the land groove 7 is arranged in a part of the center land portion 6 in the tire width direction D1. Further, since one end portion of the land groove 7 is connected to the peripheral grooves 3 and 4, the land groove 7 achieves a function serving as the groove (for example, a drainage function and an edge function).

In the meantime, since one end portion of the land groove 7 is connected to the peripheral grooves 3 and 4, a rigidity of the land groove 7 in one end portion side becomes small. Accordingly, the land groove 7 is provided with one bent portion 7a in one end portion side which is connected to the peripheral grooves 3 and 4. As a result, it is possible to inhibit the rigidity of the land groove 7 from being small in one end portion side. Therefore, it is possible to inhibit a rigidity difference from being generated in the tire width direction D1 of the center land portion 6 due to the land groove 7.

The bent portion 7a of the land groove 7 is formed into a bowed shape (a curved shape), and the land groove 7 is provided with linear portions 7b and 7c which extend linearly to both sides of the bent portion 7a in the tire width direction D1. The linear portion 7b connected to the peripheral grooves 3 and 4 is called as the first linear portion 7b, and the linear portion 7c disconnected from the peripheral grooves 4 and 3 is called as the second linear portion 7c.

The bent portion 7a of the land groove 7 is arranged in the end areas A1 and A2 of the center land portion 6 in the tire width direction D1. Specifically, the bent portion 7a of the land groove 7 connected to the shoulder peripheral groove 3 is arranged in the outside end area A2, and the bent portion 7a of the land groove 7 connected to the center peripheral groove 4 is arranged in the inside end area A1. Further, the end portion of the second linear portion 7c extends to the end areas A1 and A2 in the tire width direction D1.

As mentioned above, the bent portion 7a is arranged in both the end areas A1 and A2 of the center land portion 6. As a result, the rigidity of the end areas A1 and A2 of the center land portion 6 in the tire width direction D1 is enlarged, and it is possible to inhibit the rigidity difference from being generated in the tire width direction D1 of the center land portion 6.

A position of the bent portion 7a in the tire width direction D1 is set to a position of a bending point 7d. The bending point 7d is a position on an end edge coming to an inner side of the convex shape in the land groove 7 in the case that the bent portion 7a is formed into the bowed shape, and is also a point at the most end position in the tire peripheral direction D2 in the bent portion 7a. Further, the bending point 7d is a point of an inflection position (a connection position of two straight lines) on an end edge coming to an inner side of the convex shape of the land groove 7 in the case that the bent portion 7a is formed into an inflection shape (a shape obtained by folding the straight line).

Further, the bent portion 7a of the land groove 7 connected to one side (that is, an end edge in the first width direction D11 side) of the center peripheral groove 4 in the tire width direction D1 is formed into a convex shape toward the second peripheral direction D22. Further, the bent portion 7a of the land groove 7 connected to the other side (that is, an end edge in the second width direction D12 side) of the center peripheral groove 4 in the tire width direction D1 is formed into a convex shape toward the first peripheral direction D21 side.

Therefore, the bent portion 7a arranged in the vicinity of the center peripheral groove 4 in the first width direction D11 side, and the bent portion 7a arranged in the vicinity of the center peripheral groove 4 in the second width direction D12 side are formed into the convex shapes toward the opposite sides. As a result, it is possible to inhibit the rigidity of the center peripheral groove 4 from becoming smaller in relation to the force in the specific direction of the tire peripheral direction D2.

Further, a direction D3 that the end portion of the land groove 7 connected to the end edge of the center peripheral groove 4 in the first width direction D11 side is inclined to the tire width direction D1 is the same as a direction D4 that the end portion of the land groove 7 connected to the end edge of the center peripheral groove 4 in the second width direction D12 side is inclined to the tire width direction D1. Specifically, as shown by a broken line in FIG. 2, the respective inclined directions D3 and D4 are diagonally left up (diagonally right down) directions. The wordings "inclined direction is the same" includes the case that the directions are the same even if the angles of incline in relation to the tire width direction D1 are different.

Here, a description will be given of an operation of the structure mentioned above with reference to FIGS. 3 and 4.

Figure 3:
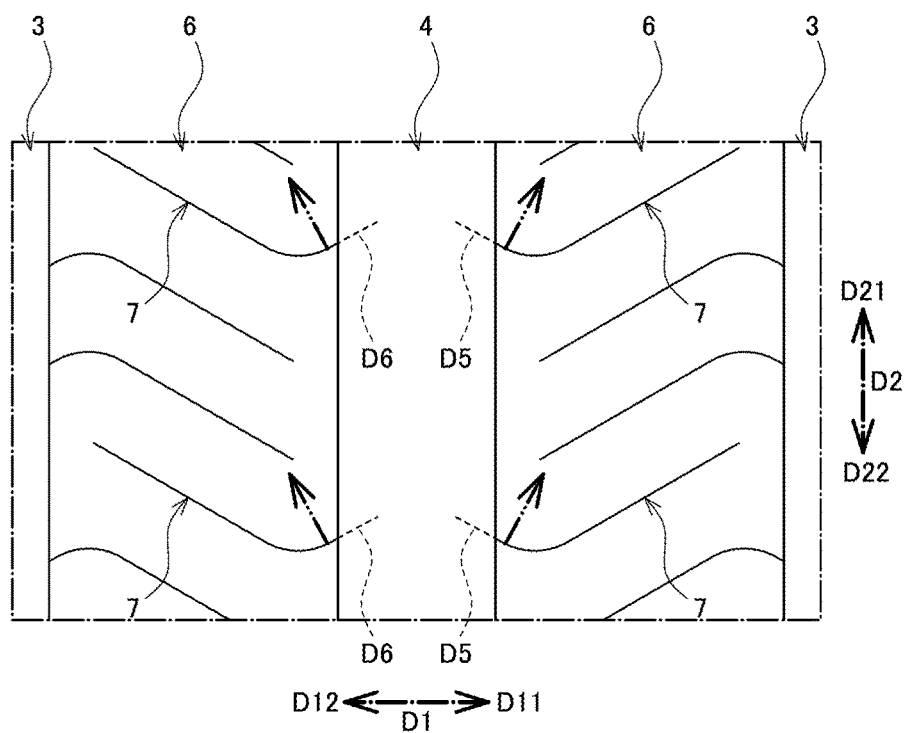
FIG. 3 is an enlarged development view of a substantial part of a tread surface of a pneumatic tire according to a comparative example, and an explanatory view of a force applied at a time of braking.

First of all, as shown in FIG. 3, in a tire according to a comparative example, directions D5 and D6 in which the end portion of the land groove 7 connected to the center peripheral groove 4 is inclined to the tire width direction D1 are different as shown by broken lines in FIG. 3. Specifically, the direction D5 in which the end portion of the land groove 7 in the first width direction D11 side is inclined is a diagonally left up direction, and the direction D6 in which the end portion of the land groove 7 in the second width direction D12 side is inclined is a diagonally right up direction.

Further, for example, in the case that the tire according to the comparative example is exposed to the force in the first peripheral direction D21 which is an opposite side to a tire turning direction when the tire is braked against the dry road surface, the land groove 7 is deformed in such a manner as to widen the width of the center peripheral groove 4 (in a direction of a two-dot chain arrow in FIG. 3). As a result, the dry braking performance is lowered.

Figure 4:
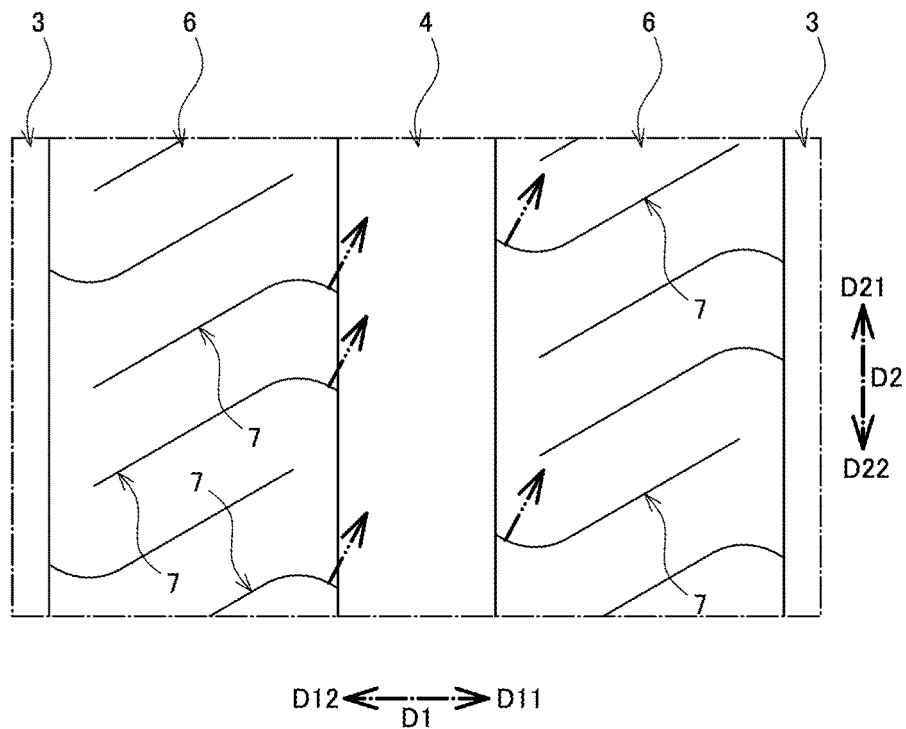
FIG. 4 is an enlarged development view of the substantial part of the tread surface of the pneumatic tire according to FIGS. 1 and 2, and an explanatory view of the force applied at a time of braking.

On the contrary, as shown in FIG. 4, in the tire 1 according to the present embodiment, the directions in which the end portions of the land groove 7 connected to the center peripheral groove 4 are inclined to the tire width direction D1 are the same as each other. Further, in the case that the tire 1 according to the present embodiment is exposed to the force in the first peripheral direction D21 when the tire is braked against the dry road surface in the same manner, the land groove 7 is deformed in such a manner as to maintain the width of the center peripheral groove 4 (in a direction of a two-dot chain arrow in FIG. 4). As a result, the dry braking performance can be improved in comparison with the comparative example.

Next, a description will be given of the structure of the land groove 7 in relation to the shoulder peripheral groove 3 and the land portions 5 and 6 in the first width direction D11 side with reference to FIG. 5.

Figure 5:
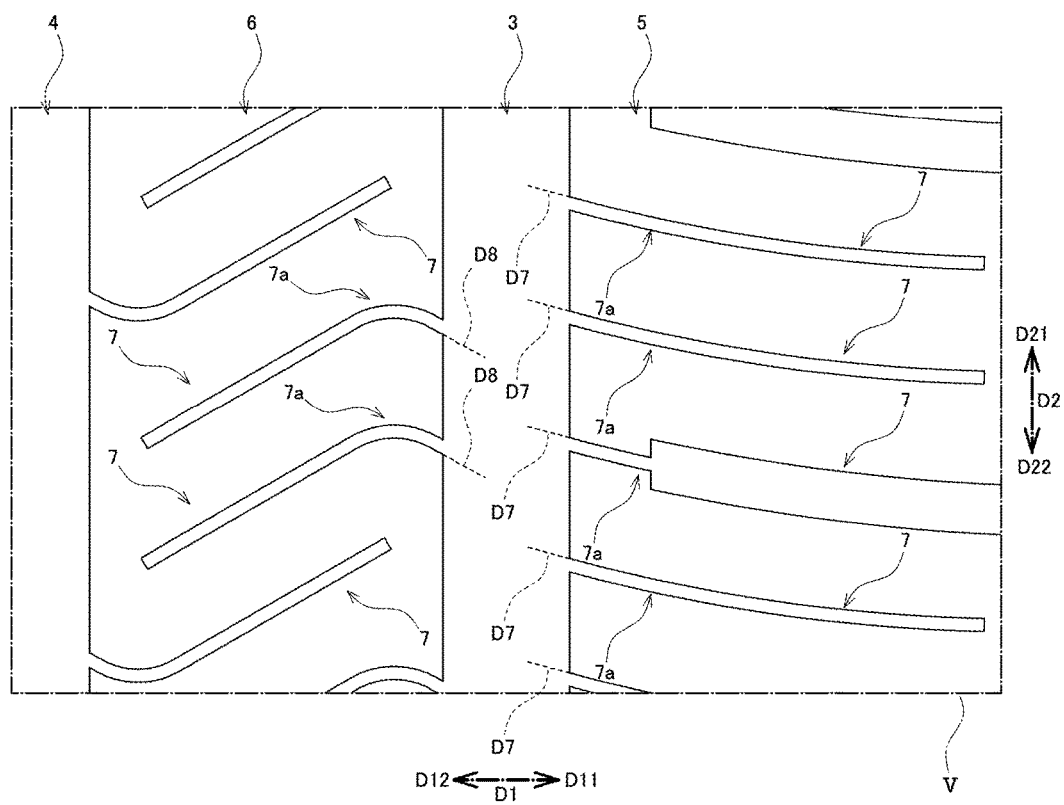
FIG. 5 is an enlarged view of an area V in FIG. 1.

As shown in FIG. 5, in the land groove 7 provided in the shoulder land portion 5, one end portion arranged in the inner side in the tire width direction D1 is connected to the shoulder peripheral groove 3. Further, since the one end portion of the land groove 7 is connected to the shoulder peripheral groove 3, the land groove 7 achieves a function serving as the groove (for example, the drainage function and the edge function).

Further, a direction D7 in which the end portion of the land groove 7 of the shoulder land portion 5 connected to the shoulder peripheral groove 3 is inclined to the tire width direction D1 is the same as a direction D8 in which the end portion of the land groove 7 of the center land portion 6 connected to the shoulder peripheral groove 3 is inclined to the tire width direction D1. Specifically, as shown by broken lines in FIG. 5, the directions D7 and D8 of the respective inclinations are the diagonally left up (diagonally right down) direction.

As a result, it is possible to inhibit the shoulder peripheral groove 3 from being deformed in such a manner as to be widened when the tire 1 is braked against the dry road surface. Therefore, it is possible to improve the dry braking performance. Since the shoulder peripheral groove 3 affects when turning on the dry road surface, the dry turning performance can be also improved.

In the present embodiment, the directions D3 and D4 in which the end portion of the land groove 7 connected to the center peripheral groove 4 is inclined to the tire width direction D1 are the same as the directions D7 and D8 in which the end portion of the land groove 7 connected to the shoulder peripheral groove 3 is inclined to the tire width direction D1. More specifically, the directions D3, D4, D7 and D8 in which the end portion of the land groove 7 connected to each of the peripheral grooves 3 and 4 is inclined to the tire width direction D1 are all the same.

Further, a bent portion 7a of the land groove 7 in the shoulder land portion 5 connected to the shoulder peripheral groove 3 is formed so as to be a convex shape toward the second peripheral direction D22 side. Further, the bent portion 7a of the land groove 7 in the center land portion 6 connected to the shoulder peripheral groove 3 is formed so as to be a convex shape toward the first peripheral direction D21 side.

Therefore, the bent portion 7a of the shoulder land portion 5 and the bent portion 7a of the center land portion 6 are formed so as to be the convex shape toward the opposite sides. As a result, it is possible to inhibit the rigidity of the shoulder peripheral groove 3 from becoming small in relation to the force in the specific direction of the tire peripheral direction D2.

As described above, the pneumatic tire 1 of the embodiment includes: a tread portion 2 having a plurality of peripheral grooves 3 and 4 which extend along a tire peripheral direction D2, and a plurality of land portions 5 and 6 which are sectioned by the plurality of peripheral grooves 3 and 4, the land portions 5 or 6 is provided with a land groove 7 connected to the peripheral grooves 3 and 4 only in first end portion among both end portions, and a direction D3 and D7 in which the first end portion of the land groove 7 connected to first side of at least one the peripheral groove 3 or 4 is inclined to a tire width direction D1 is the same as a direction D4 and D8 in which the first portion of the land groove 7 connected to second side of the peripheral groove 3 or 4 is inclined to the tire width direction D1.

According to the structure mentioned above, the directions D3 and D7 in which the first end portion of the land groove 7 connected to the first side (one side) of at least one peripheral groove 3 or 4 is inclined to the tire width direction D1 are the same as the directions D4 and D8 in which the first end portion of the land groove 7 connected to the second side (other side) of the peripheral groove 3 or 4 is inclined to the tire width direction D1. As a result, it is possible to suppress such a deformation that the widths of the peripheral grooves 3 and 4 are expanded when being braked on the dry road surface, regardless of the tire turning direction.

Further, since only one end portion of both end portions of the land groove 7 is connected to the peripheral grooves 3 and 4, the rigidity of the end areas A1 and A2 in the tire width direction D1 is enlarged in the land portion 6 which is arranged between the peripheral grooves 3 and 4. Therefore, it is possible to improve the dry braking performance of the tire 1 on the basis of the matter that it is possible to suppress the deformation of the end areas A1 and A2 of the land portion 6 in the tire width direction when being braked on the dry road surface. Since one end portion of the land groove 7 is connected to the peripheral grooves 3 and 4, the land groove 7 can achieve the function serving as the groove (the drainage function and the edge function).

In the pneumatic tire 1 of the embodiment, the land groove 7 is formed so as to have one bent portion 7a in the first end portion side of the land groove 7.

According to the structure mentioned above, for the rigidity becoming small since the first end portion of the land groove 7 is connected to the peripheral grooves 3 and 4, the land groove 7 has one bent portion 7a in the first end portion side. As a result, since the rigidity of the bent portion 7a is large, it is possible to inhibit the rigidity of the land groove 7 in the first end portion side from being small. Therefore, it is possible to inhibit the rigidity of the peripheral grooves 3 and 4 from being small.

In the pneumatic tire 1 of the embodiment, the bent portion 7a of the land groove 7 connected to the first D11 side of the peripheral groove 3 or 4 is formed so as to be convex toward one D22 side in a tire peripheral direction D2, and the bent portion 7a of the land groove 7 connected to the second D12 side of the peripheral groove 3 or 4 is formed so as to be convex toward the other D21 side in the tire peripheral direction D2.

According to the structure mentioned above, the bent portion 7a of the land groove 7 connected to the first D11 side of the peripheral grooves 3 and 4 is formed so as to be convex toward the one D22 side in the tire peripheral direction D2, and the bent portion 7a of the land groove 7 connected to the second D12 side of the peripheral grooves 3 and 4 is formed so as to be convex toward the other D21 side in the tire peripheral direction D2, that is, toward the opposite side. As a result, it is possible to inhibit the rigidity of the peripheral grooves 3 and 4 from being small in relation to the force in the specific direction of the tire peripheral direction D2.

In the pneumatic tire 1 of the embodiment, the bent portion 7a of the land groove 7 arranged in the land portion 6 arranged between the peripheral grooves 3 and 4 is arranged in an end area A1 or A2 of the land portion 6 in the tire width direction D1.

According to the structure mentioned above, since the bent portion 7a of the land groove 7 is arranged in the end areas A1 and A2 of the land portion 6 in the tire width direction D1, the rigidity of the end areas A1 and A2 of the land portion 6 in the tire width direction D1 is enlarged. As a result, it is possible to further inhibit the rigidity of the peripheral grooves 3 and 4 from being small.

The pneumatic tire 1 is not limited to the configuration of the embodiment described above, and the effects are not limited to those described above. It goes without saying that the pneumatic tire 1 can be variously modified without departing from the scope of the subject matter of the present invention. For example, the constituents, methods, and the like of various modified examples described below may be arbitrarily selected and employed as the constituents, methods, and the like of the embodiments described above, as a matter of course.

The pneumatic tire 1 according to the embodiment mentioned above is structured such that the land groove 7 is formed so as to have one bent portion 7a. However, the pneumatic tire 1 is not limited to the structure mentioned above. For example, the land groove 7 may be structured such as to be provided with a plurality of bent portions 7a. Further, for example, the land groove 7 may be structured such as to be provided with no bent portion 7a and be constructed only by the linear portion.

Further, in the pneumatic tire 1 according to the embodiment mentioned above, the bent portion 7a of the land groove 7 connected to one side of the peripheral grooves 3 and 4 and the bent portion 7a of the land groove 7 connected to the other side are structured such as to be formed to be convex toward the different directions in the tire peripheral direction D2. However, the pneumatic tire 1 is not limited to the structure mentioned above. For example, the bent portion 7a of the land groove 7 connected to one side of the peripheral grooves 3 and 4 and the bent portion 7a of the land groove 7 connected to the other side may be structured such as to be formed to be convex toward the same direction in the tire peripheral direction D2.

Further, in the pneumatic tire 1 according to the embodiment mentioned above, the bent portion 7a of the land groove 7 is structured such as to be arranged in the end areas A1 and A2 of the land portion 6 in the tire width direction D1. However, the pneumatic tire is not limited to the structure mentioned above. For example, the bent portion 7a of the land groove 7 may be structured such as to be arranged in the center area A3 of the land portion 6 in the tire width direction D1.

Further, the pneumatic tire 1 according to the embodiment mentioned above is structured such that the directions D3 and D7 in which the first end portion of the land groove 7 connected to the first side of the peripheral grooves 3 and 4 is inclined to the tire width direction D1 are the same as the directions D4 and D8 in which the first end portion of the land groove 7 connected to the second side of the peripheral grooves 3 and 4 is inclined to the tire width direction D1 for all of the peripheral grooves 3 and 4. However, the pneumatic tire 1 is not limited to the structure mentioned above. For example, only one of the peripheral grooves 3 and 4 may be structured as mentioned above.

What is claimed is:
1. A pneumatic tire comprising:
a tread portion having at least one peripheral groove which extends along a tire peripheral direction, and at least one land portion which is sectioned by the at least one peripheral groove,
wherein a tire width direction includes a first width side and a second width side which is opposite the first width side,
wherein the at least one peripheral groove includes a first peripheral groove formed into a linear shape so as to be parallel to the tire peripheral direction and a second peripheral groove arranged toward the first width side of the first peripheral groove,
wherein the at least one land portion includes a first land portion arranged between the first peripheral groove and the second peripheral groove and a second land portion arranged toward the second width side of the first peripheral groove, wherein the first land portion is provided with a first land groove having a first end portion at the first width side of the first land groove and a second end portion at the second width side of the first land groove, the first end portion of the first land groove being away from the at least one peripheral groove, the second end portion of the first land groove being connected to the first peripheral groove, wherein the first land portion is provided with a third land groove having a first end portion at the first width side of the third land groove and a second end portion at the second width side of the third land groove, the first end portion of the third land groove being connected to the second peripheral groove, the second end portion of the third land groove being away from the at least one peripheral groove, wherein the first land groove is formed so as to have only one bent portion, the one bent portion of the first land groove being arranged at the second width side of the first land groove, wherein the third land groove is formed so as to have only one bent portion, the one bent portion of the third land groove being arranged at the first width side of the third land groove, wherein the first land portion includes a pair of end areas and a center area, the pair of end areas and the center area being sectioned evenly in the tire width direction, wherein the bent portion of the first land groove is arranged in the end area at the second width side of the first land portion, wherein the bent portion of the third land groove is arranged in the end area at the first width side of the first land portion, wherein the first end portion of the first land groove is arranged in the end area at the first width side of the first land portion, wherein the second end portion of the third land groove is arranged in the end area at the second width side of the first land portion, wherein the second land portion is provided with a second land groove having a first end portion at the first width side of the second land groove and a second end portion at the second width side of the second land groove, the first end portion of the second land groove being connected to the first peripheral groove, the second end portion of the second land groove being away from the at least one peripheral groove, and wherein a direction in which the second end portion of the first land groove is inclined with respect to the tire width direction is the same as a direction in which the first end portion of the second land groove is inclined with respect to the tire width direction.

2. The pneumatic tire according to claim 1, wherein a direction in which the first end portion of the third land groove is inclined with respect to the tire width direction is the same as the direction in which the first end portion of the second land groove is inclined with respect to the tire width direction.

3. The pneumatic tire according to claim 1, wherein the bent portion of the first land groove, the bent portion of the second land groove and the bent portion of the third land groove are respectively formed into a curved shape, the first land groove, the second land groove and the third land groove are respectively provided with linear portions which comprise a first linear portion and a second linear portion and which linearly extend respectively toward both sides of the bent portion of the first land groove, the bent portion of the second land groove and the bent portion of the third land groove in the tire width direction, in each of the first land groove, the second land groove and the third land groove, a direction in which the first linear portion is inclined with respect to the tire width direction is opposite to a direction in which the second linear portion is inclined with respect to the tire width direction.

4. A pneumatic tire comprising:

a tread portion having at least one peripheral groove which extends along a tire peripheral direction, and at least one land portion which is sectioned by the at least one peripheral groove, wherein a tire width direction includes a first width side and a second width side which is opposite the first width side, wherein the tire peripheral direction includes a first peripheral side and a second peripheral side which is opposite the first peripheral side, wherein the at least one peripheral groove includes a first peripheral groove formed into a linear shape so as to be parallel to the tire peripheral direction and a second peripheral groove arranged toward the first width side of the first peripheral groove, wherein the at least one land portion includes a first land portion arranged between the first peripheral groove and the second peripheral groove and a second land portion arranged toward a second width side of the first peripheral groove, wherein the first land portion is provided with a first land groove having a first end portion at a first width side of the first land groove and a second end portion at a second width side of the first land groove, the first end portion of the first land groove being away from the at least one peripheral groove, the second end portion of the first land groove being connected to the first peripheral groove, wherein the first land portion is provided with a third land groove having a first end portion at the first width side of the third land groove and a second end portion at the second width side of the third land groove, the first end portion of the third land groove being connected to the second peripheral groove, the second end portion of the third land groove being away from the at least one peripheral groove, wherein the first land groove is formed so as to have only one bent portion, the one bent portion of the first land groove being arranged at the second width side of the first land groove, wherein the third land groove is formed so as to have only one bent portion, the one bent portion of the third land groove being arranged at the first width side of the third land groove, wherein the first land portion includes a pair of end areas and a center area, the pair of end areas and the center area being sectioned evenly in the tire width direction, wherein the bent portion of the first land groove is arranged in the end area at the second width side of the first land portion, wherein the bent portion of the third land groove is arranged in the end area at the first width side of the first land portion, wherein the bent portion of the first land groove is formed so as to be convex toward the first peripheral side, wherein the bent portion of the third land groove is formed so as to be convex toward the second peripheral side, wherein the bent portion of the first land groove, the bent portion of the second land groove and the bent portion of the third land groove are respectively formed into a curved shape, wherein the first land groove, the second land groove and the third land groove are respectively provided with linear portions which comprise a first linear portion and a second linear portion and which linearly extend respectively toward both sides of the bent portion of the first land groove, the bent portion of the second land groove and the bent portion of the third land groove in the tire width direction, wherein, in each of the first land groove, the second land groove and the third land groove, a direction in which the first linear portion is inclined with respect to the tire width direction is opposite to a direction in which the second linear portion is inclined with respect to the tire width direction, wherein the second land portion is provided with a second land groove having a first end portion at the first width side of the second groove and a second end portion at the second width side of the second groove, the first end portion of the second land groove being connected to the first peripheral groove, the second end portion of the second land groove being away from the at least one peripheral groove, and wherein a direction in which the second end portion of the first land groove is inclined with respect to the tire width direction is the same as a direction in which the first end portion of the second land groove is inclined with respect to the tire width direction.

5. The pneumatic tire according to claim 4, wherein the second land groove is formed so as to have only one bent portion, the one bent portion of the second land groove being arranged at the first width side of the second land groove, and wherein the bent portion of the second land groove is formed so as to be convex toward the second peripheral side.

6. The pneumatic tire according to claim 5, wherein the bent portion of the first land groove, the bent portion of the second land groove and the bent portion of the third land groove are respectively formed into a curved shape, the first land groove, the second land groove and the third land groove are respectively provided with linear portions which comprise a first linear portion and a second linear portion and which linearly extend respectively toward both sides of the bent portion of the first land groove, the bent portion of the second land groove and the bent portion of the third land groove in the tire width direction, in each of the first land groove, the second land groove and the third land groove, a direction in which the first linear portion is inclined with respect to the tire width direction is opposite to a direction in which the second linear portion is inclined with respect to the tire width direction.

7. A pneumatic tire comprising:

a tread portion having at least one peripheral groove which extends along a tire peripheral direction, and at least one land portion which is sectioned by the at least one peripheral groove, wherein a tire width direction includes a first width side and a second width side which is opposite the first width side, wherein the at least one peripheral groove includes a first peripheral groove formed into a linear shape so as to be parallel to the tire peripheral direction and a second peripheral groove arranged toward the first width side of the first peripheral groove, wherein the at least one land portion includes a first land portion arranged between the first peripheral groove and the second peripheral groove and a second land portion arranged toward the second width side of the first peripheral groove, wherein the first land portion is provided with a first land groove having a first end portion at the first width side of the first land groove and a second end portion at the second width side of the first land groove, the first end portion of the first land groove being away from the at least one peripheral groove, the second end portion of the first land groove being connected to the first peripheral groove, wherein the first land portion is provided with a third land groove having a first end portion at the first width side of the third land groove and a second end portion at the second width side of the third land groove, the first end portion of the third land groove being connected to the second peripheral groove, the second end portion of the third land groove being away from the at least one peripheral groove, wherein the first land groove is formed so as to have only one bent portion, the one bent portion of the first land groove being arranged at the second width side of the first land groove, wherein the third land groove is formed so as to have only one bent portion, the one bent portion of the third land groove being arranged at the first width side of the third land groove, wherein the first land portion includes a pair of end areas and a center area, the pair of end areas and the center area being sectioned evenly in the tire width direction, wherein the bent portion of the first land groove is arranged in the end area at the second width side of the first land portion, wherein the bent portion of the third land groove is arranged in the end area at the first width side, and wherein a portion of the first land groove is superposed on a portion of the third land groove as viewed in the tire peripheral direction, wherein the second land portion is provided with a second land groove having a first end portion at the first width side of the second land groove, and a second end portion at the second width side of the second land groove, the first end portion of the second land groove being connected to the first peripheral groove, the second end portion of the second land groove being away from the at least one peripheral groove, and wherein a direction in which the second end portion of the first land groove is inclined with respect to the tire width direction is the same as a direction in which the first end portion of the second land groove is inclined with respect to the tire width direction.

8. The pneumatic tire according to claim 7, wherein
the bent portion of the first land groove, the bent portion of the second land groove and the bent portion of the third land groove are respectively formed into a curved shape,
the first land groove, the second land groove and the third land groove are respectively provided with linear portions which comprise a first linear portion and a second linear portion and which linearly extend respectively toward both sides of the bent portion of the first land groove, the bent portion of the second land groove and the bent portion of the third land groove in the tire width direction,
in each of the first land groove, the second land groove and the third land groove, a direction in which the first linear portion is inclined with respect to the tire width direction is opposite to a direction in which the second linear portion is inclined with respect to the tire width direction.

* * * * *